UNITED STATES PATENT OFFICE.

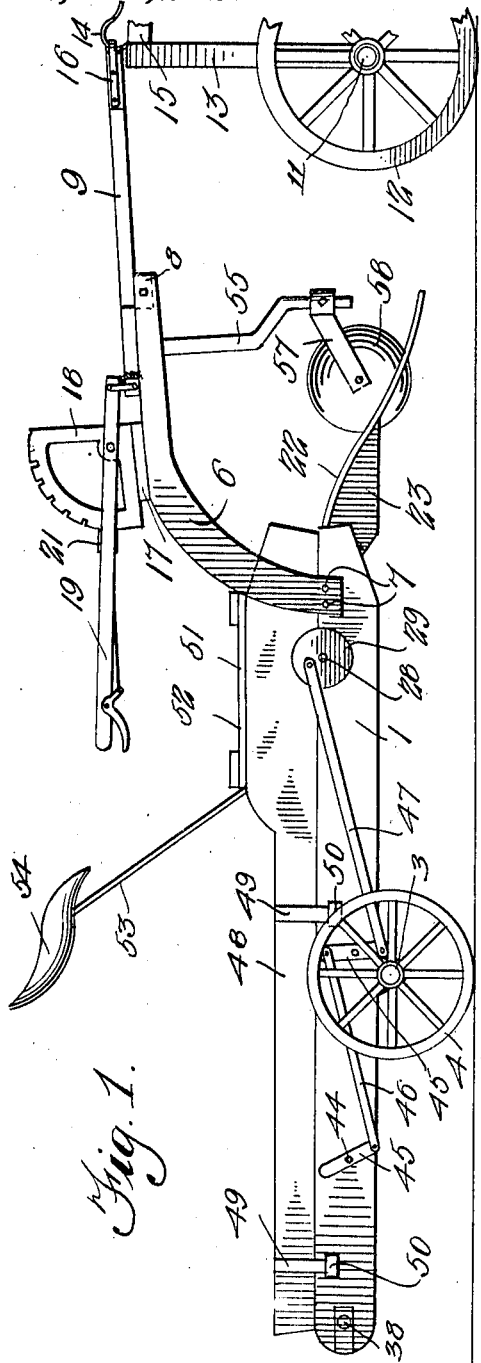

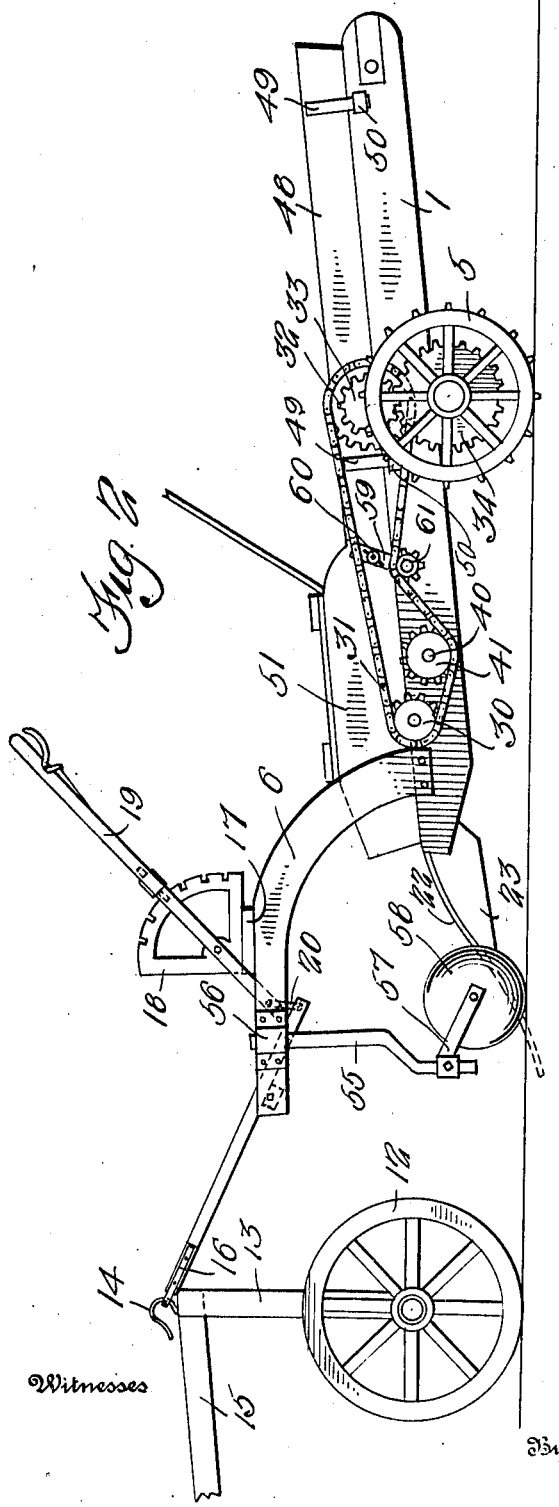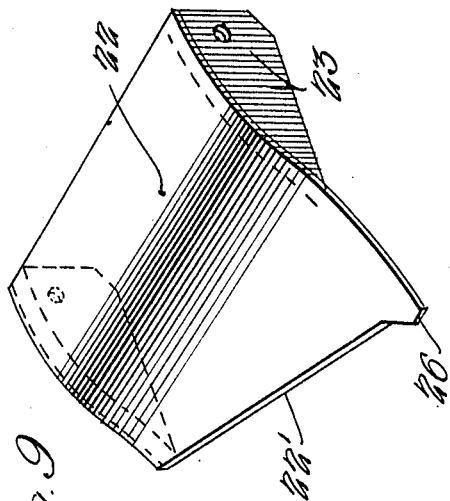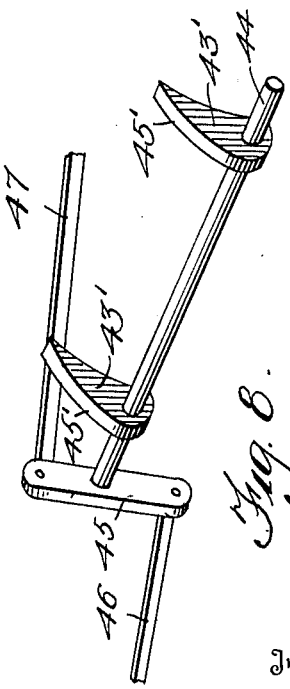

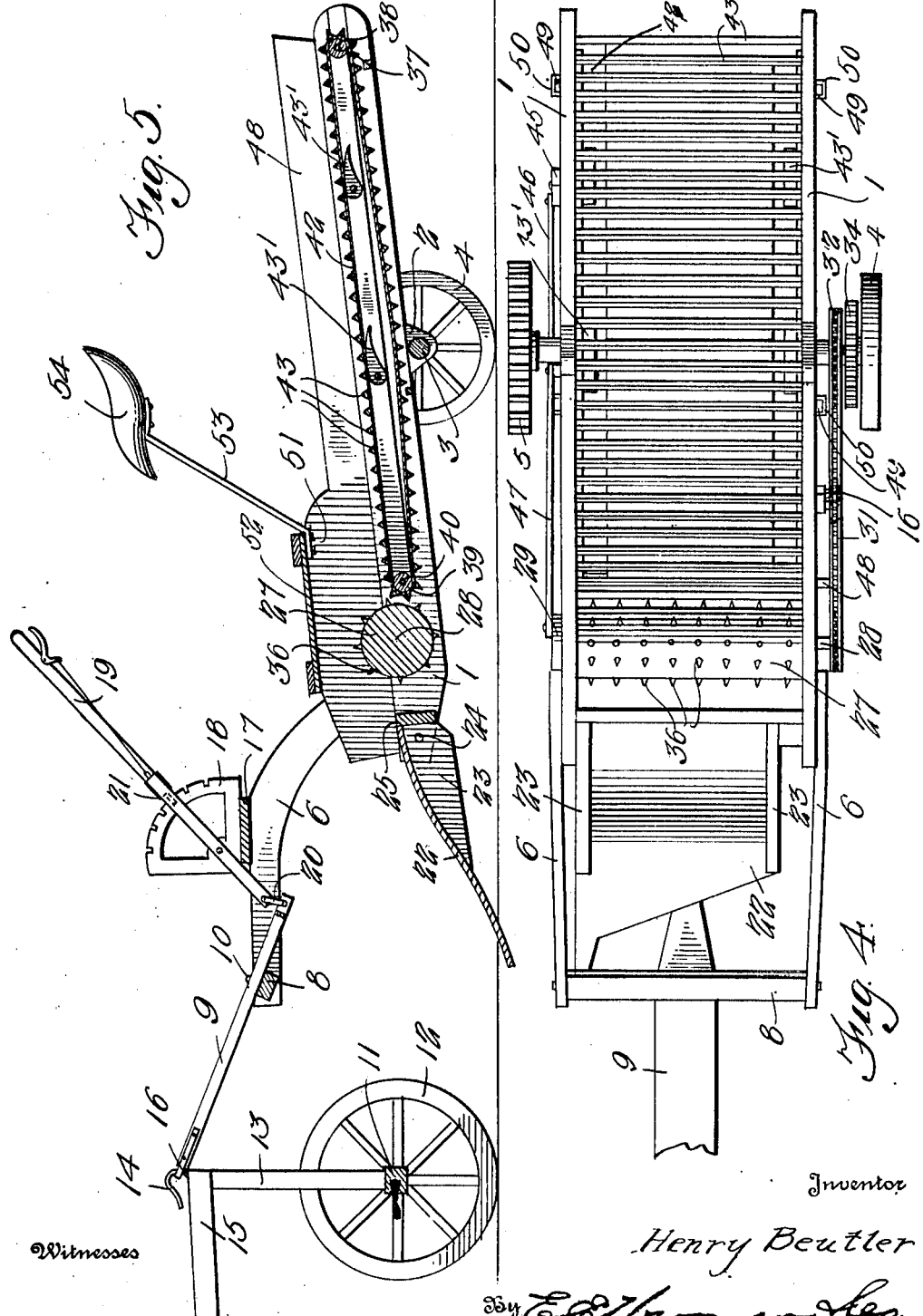

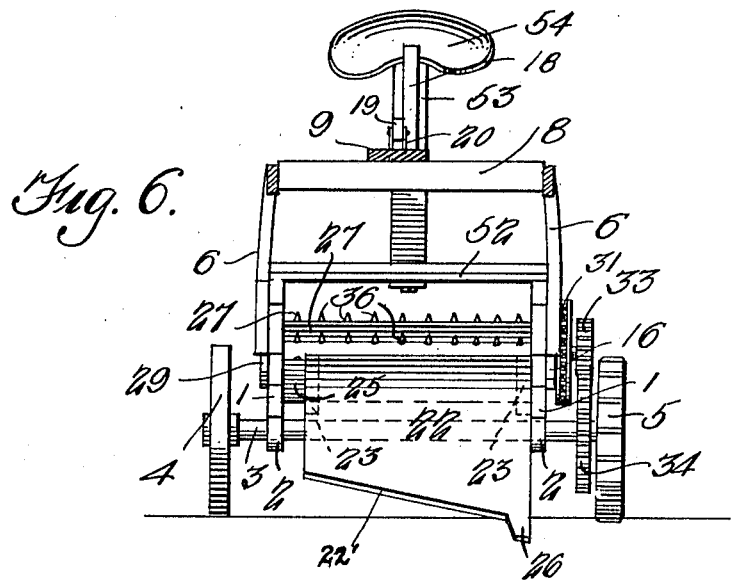
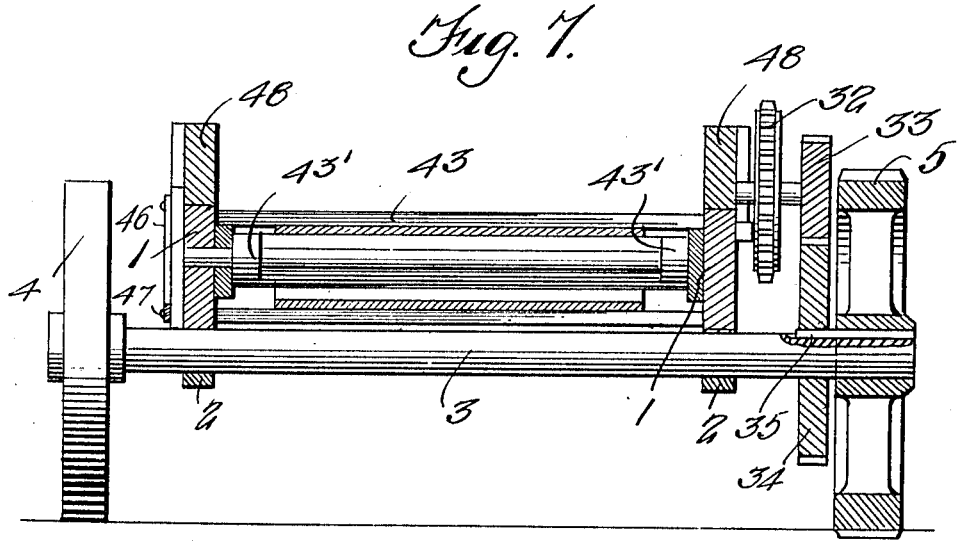

HENRY BEUTLER, OF DRAKE, NORTH DAKOTA.

QUACK-GRASS ROOTER.

1,314,122.  Specification of Letters Patent.  Patented Aug. 26, 1919.

Application filed July 20, 1918. Serial No. 245,880.

*To all whom it may concern:*

Be it known that I, HENRY BEUTLER, a citizen of the United States of America, residing at Drake, in the county of McHenry and State of North Dakota, have invented certain new and useful Improvements in Quack-Grass Rooters, of which the following is a specification, reference being had therein to the accompanying drawing.

This invention relates to a quack grass rooter and has for its principal object the production of a machine which is adapted to dig up the grass and separate the roots thereof from the soil.

Another object of this invention is the production of a quack grass rooter which is provided with an adjustable frame so arranged as to regulate the depth to which the plow digs, thereby causing only a sufficient amount of earth to be elevated for lifting the roots of the grass to such a position as to permit the same to be separated from the soil thus lifted.

Another object of this invention is the production of a quack grass rooter which has a slatted apron movably mounted in the rear of a depositing roller whereby as the apron is shaken by the shaker pawls, the soil upon the roots of the grass will be shaken so as to cause the grass to be moved to a desired position or ejected at the rear portions of the machine.

With these and other objects in view this invention consists in general of certain novel combinations, constructions and arrangements of parts as will be hereinafter fully described and claimed.

In the accompanying drawings:

Figure 1 is a side elevation of the quack grass rooter.

Fig. 2 is an elevation of the opposite side of the machine with respect to the disclosure made in Fig. 1.

Fig. 3 is a top plan view of the quack grass rooter, a portion of the forward truck being broken away.

Fig. 4 is a bottom plan view of the quack grass rooter with the forward truck removed.

Fig. 5 is a central longitudinal section through the machine.

Fig. 6 is a front elevation of the quack grass rooter with the forward truck removed.

Fig. 7 is a transverse section through the machine illustrating the manner in which the driving connections are assembled.

Fig. 8 is a fragmentary detail perspective view of a portion of the shaking mechanism for the slatted apron.

Fig. 9 is a detail perspective view of the plow.

Referring to the accompanying drawings by numerals it will be seen that the quack grass rooter comprises a frame formed of a pair of side beams 1 which have bearings 2 carried upon their lower portions through which the main supporting shaft 3 extends, as shown in Fig. 5. This supporting shaft 3 has a supporting wheel 4 rotatably mounted upon one end and a drive wheel 5 upon its opposite end, whereby the frame of the quack grass rooter will be held in an elevated position.

The plow beams 6 are fixedly secured by the securing members 7 to the forward ends of the side beams 1 and as these plow beams 6 are curved throughout their entire length, it will be noted by referring to Figs. 1, 2 and 5 that the forward ends of these plow beams 6 are carried in a plane extending above the upper portions of the main frame of the machine. These plow beams 6 have a bar 8 pivotally mounted upon their upper forward ends and to this bar 8 a draw bar 9 is fixedly mounted, as indicated at 10.

The forward truck comprises an axle 11 supported by suitable wheels 12 and from this axle 11 projects the vertically-extending block 13 having a hook 14 carried upon its upper end. It is obvious that the pole 15, or any other suitable means, may be connected to the block 13 so as to permit draft animals or any other suitable drawing means to be applied thereto for pulling the quack grass rooter.

The draw bar 9 is provided with a loop 16 fixedly mounted upon its forward end and this loop 16 is carried by the hook 14 whereby when the forward truck is pulled, it will also pull the bar 8 and the plow beams 6 so as to move the frame forwardly.

In order to raise and lower the forward end of the machine, a board 17 is carried upon the plow beams 6 intermediate their ends and the notched quadrant 18 is fixedly mounted upon this board 17 in any suitable manner. The lever 19 is pivotally mounted upon the quadrant 18 and as the link 20 carried by the lower end of the lever 19 is secured to the inner end of the draw bar 9, it is obvious that as the lever 19 is swung upwardly or downwardly the draw bar 9 will pivot upon the beams 6 and thus raise or lower the forward end of the machine according to the direction in which the lever 19 is swung. It is, of course, obvious that the usual retaining member 21 is carried upon the lever 19 for holding this lever 19 in an adjusted position.

The plow 22 has side plates 23 carried thereon for reinforcing the plow intermediate its upper and lower portions, and this plow is secured by means of the securing elements 24 passing through the plates 23 and engaging the forward ends of the side beams 1. It will be noted by referring particularly to Fig. 5 that the inner end of the plow 22 bears against the reinforcing bar 25, thereby relieving considerable strain from the securing means 24 as the plow is being pulled through the ground. The forward end 22' of the plow slants from one side forwardly toward the remaining side to extend to the point 26. It is, therefore, obvious that as the point digs into the ground the slanting forward edge 22' of the plow 22 will facilitate the uprooting of the grass and the lifting of the grass and earth along over the curved upper surface of the plow 22.

The depositing roller 27 is rotatably mounted upon the side beams 1 and has one end of its supporting shaft 28 projecting through one of the side beams 1 and carrying a crank disk 29. The opposite end of the shaft 28 projects through the remaining side beam 1 so as to receive the sprocket 30, as shown in Fig. 2. A sprocket chain 31 passes around the sprocket 30 and also the sprocket 32. This sprocket 32 is provided with a fixed pinion 33 which meshes with the gear 34 secured to the drive wheel 5, as shown at 35. Therefore, as the drive wheel 5 rotates, it is obvious that the chain will be driven inasmuch as the rotary movement of the drive wheel will cause the gear 34 to rotate the pinion 33 and in turn impart rotary motion to the sprocket 32 so as to drive the chain 31 and thus cause the sprocket 30 to be turned. As the sprocket 30 is turned, the shaft 28 will be turned and thus impart rotary motion to the depositing roller 27. This roller 27 is provided with a plurality of spurs 36 projecting from its periphery, thereby allowing the roller to easily grip the soil and grass passing from the rear end of the plow for moving this grass and soil over onto the slatted apron to be hereinafter described.

An idle roller 37 mounted upon the shaft 38 is carried adjacent the rear ends of the side beams 1 while the driving roller 39 keyed upon the shaft 40 is rotatably mounted upon the side beams 1 adjacent their forward ends. The shaft 40 has a sprocket 41 keyed upon its projecting end and as the sprocket 41 engages the chain 31, it is obvious that as the chain is driven, rotary motion will be imparted to this sprocket.

The slatted apron comprises a pair of endless spaced strips of flexible material 42 which pass around the rollers 37 and 39 adjacent their ends. The slats 43 are permanently mounted upon these strips 42 in parallel spaced relation so as to provide sufficient space for the sifting of the soil through this apron. These slats 43 have sharpened outer edges so as to present gripping structures, although of course it is obvious that if so desired, spurs may be included as projecting from the outer portions of these slats so as to increase the gripping action of the apron as the same is in operation. As the chain 31 drives the sprocket 41 and imparts rotary motion through the shaft 40 to the roller 39, it will be seen that the roller 39 will cause the apron to move around both rollers 37 and 39. As a consequence, the quack grass which has been uprooted will pass, or be carried, toward the rear end of the machine by the movement of the apron while the spacing of the slats will permit the soil which is removed from the roots of the grass to be sifted through the apron.

In order to shake the apron and thus free the roots of the quack grass of the soil which is passed to the apron at the same time the grass is deposited thereon, rocker shafts 44 are carried by the side beams 1 in spaced relation, as shown in Fig. 5. Upon each shaft 44 are fixed the oscillating shaker pawls 43', as shown clearly in Fig. 8. These pawls 43' have rounded outer edges 45' so as to reduce friction between these pawls and the apron when the machine is in operation. The shafts 44 having a plurality of their ends projecting through one of the side beams 1, as shown in Fig. 1, so as to carry fingers 45 in a permanent manner thereon. A link 46 is connected to the lower end of the rear finger 45 and to the upper end of the forward finger. The pitman 47 is connected to the lower end of the forward finger and to the crank disk 29 fixedly mounted upon one of the projecting ends of the shaft 28. By referring to Fig. 5 it will be noted that the shaker pawls 43 engage the slatted apron at all times. As a consequence, when the shaft 28 is rotated, rotary motion will be imparted to the disk 29, thus causing the pitman 47 to be reciprocated so as to swing the forward finger 45, and thus oscillate the forward shaft. As the forward finger 45 is swung, it is obvious that the link 46 will be reciprocated so as to swing the finger 45 adjacent the rear end of the machine, thus imparting oscillating motion to the rear rocker shaft 44. As these shafts 44 are rocked, it is obvious that the shaker pawls 43' will be moved upwardly and downwardly so as to shake the apron as the apron moves thereover, and thus shake the soil from the roots of the grass which is carried upon the apron.

It is, of course, obvious that a suitable receptacle may be provided upon the rear ends of the side beams 1 or may be secured to the rear end of the machines so as to receive the quack grass which is finally dropped by the rear end portion of the machine, or the quack grass may be permitted to fall upon the surface over which the machine has passed, after which the grass may be raked up or destroyed in any manner desired.

The side boards 48 have pegs 49 engaging the brackets 50 whereby said side boards 48 will be removably retained upon said beams 1. These side boards 48 have enlarged forward portions 51 upon which is mounted a comparatively broad platform 52. This platform 52 extends above the depositing roller 27 and the forward end of the apron and provides sufficient space for the operator to ride upon the machine. It will also be noted that the seat standard 53 projects from the platform 52 and has a seat 54 upon its upper end.

The colter standard 55 is carried by a clamp or other securing means 56 upon the plow beams 6 and has the knuckle 57 projecting therefrom so as to support the colter 58. It is obvious that when the forward end of the machine is lowered so as to cause the forward end of the plow to dig into the ground, the colter 58 will constitute a gage for regulating the depth to which the plow will dig since this colter 58 will then engage the surface of the ground and ride upon the ground so as to remove part of the supporting strain from the bar 8 and draw bar 9.

The block 59 is adjustably mounted, as indicated at 60, upon a shaft or other supporting means whereby this block 59 may be swung so as to draw the idle pinion 61 into a desired engagement with the chain 31 for tightening the chain as indicated in Fig. 2, thus constituting a chain tightener for taking up any play or slack movement in the chain.

When this quack grass rooter is in operation, the lever 19 is first moved to extend in a substantially horizontal plane, as shown in Fig. 1. The operator may then be mounted upon the platform 52 and resting upon the seat, and at this time the machine may be taken to any field or place desired inasmuch as the plow will be carried spaced above the surface of the ground while the supporting weight of the machine will be imparted to the front truck and to the supporting wheel 4 and drive wheel 5. Upon arriving at the place where the quack grass is to be uprooted, the lever 19 is then swung upwardly to the position illustrated in Figs. 2 and 5, thus causing the forward end of the plow to go into engagement with the ground while the colter 58 will then ride upon the surface of the ground. As the quack grass and earth move upwardly upon the curved upper surface of the plow 22, it will then move into engagement with the depositing roller 27. As this roller will at this time be rotating by the movement of the drive wheel 5, the soil and quack grass will then be moved over and deposited upon the slatted apron extending from the rear portions of the depositing roller 27. The continued movement of the apron will cause the quack grass and soil to be taken from the roller and as the shaker pawls are also in operation, it is obvious that the apron may be shaken so as to cause the soil to be removed from the roots of the quack grass while the soil may then fall through the apron to the ground, although the grass will be moved to the rear portions of the machine and disposed of in any desired manner.

From the foregoing description it will be seen that a very efficient quack grass rooter has been constructed which may be adjusted so as to pass over the surface or road or a field without injuring the same, although the forward end may be lowered so as to cause the plow to dig into the ground for moving the soil and quack grass to the depositing roller, and then over the depositing roller to the apron at which time the soil will be freed from the roots of the grass.

It is, of course, obvious that many minor detail changes may be made in the construction of this invention without departing from the spirit thereof; therefore, it is not intended to limit the construction to the specific form herein disclosed but to include all such forms of the device as properly come within the scope of the invention as claimed.

What is claimed as new is:—

1. In a machine of the class described the combination of a supporting frame, a plow carried upon the forward portions of said frame, a depositing roller carried upon said frame behind said plow, an apron carried by said frame behind said roller to a point adjacent the rear end of said frame, means for operating said apron and said roller whereby quack grass and soil may be uprooted by said plow and then engaged by said roller and deposited upon said apron whereby the soil and quack grass may be moved toward the rear portions of said frame, and oscillating means for shaking said apron whereby the soil will be shaken from the roots of the grass, thereby causing the grass to be ejected from the machine adjacent the rear end of said frame while the soil will fall through said apron to the ground.

2. In a machine of the class described, the combination of a supporting frame, a plow carried upon the forward portions of said frame, a depositing roller carried upon said frame behind said plow, an apron carried by said frame behind said roller to a point adjacent the rear end of said frame, means for operating said apron and said roller whereby quack grass and soil may be uprooted by said plow and then engaged by said roller and deposited upon said apron whereby the soil and quack grass may be moved toward the rear portions of said frame, and oscillating shaker pawls carried by said frame, means for shaking said pawls whereby as said pawls are shaken they will shake said apron thereby causing the soil carried by the roots of the quack grass to be shaken therefrom and fall through the apron to the ground while quack grass will pass to the rear end of said frame.

3. In a machine of the class described, the combination of a supporting frame, digging means carried upon said frame, an endless apron carried by said frame, means for moving said endless apron, rocker shafts carried by said frame, fingers carried by said rocker shafts, a link connecting one of said fingers to the remaining finger, a cam disk mounted upon said frame, means for turning said cam disk, a pitman connected to said cam disk and said last-mentioned finger whereby as said cam disk is rotated said pitman will rock one of said fingers, thereby causing said link to rock the remaining finger whereby said shafts will be rocked, and shaker pawls carried upon said shafts and engaging said apron, whereby as quack grass and soil are deposited by said digging means upon said apron, said shaker pawls will shake said apron for causing the soil to fall through said apron to the ground while the grass is moved toward the rear end of said machine.

In testimony whereof I hereunto affix my signature.

HENRY BEUTLER.

Copies of this patent may be obtained for five cents each, by addressing the "Commissioner of Patents, Washington, D. C."